United States Patent [19]

Googin et al.

[11] Patent Number: 4,614,592

[45] Date of Patent: Sep. 30, 1986

[54] PROCESS FOR REMOVING MERCURY FROM AQUEOUS SOLUTIONS

[75] Inventors: John M. Googin; John M. Napier, both of Oak Ridge; Mark A. Makarewicz; Paul F. Meredith, both of Knoxville, all of Tenn.

[73] Assignee: The United States of America as represented by the United States Department of Energy, Washington, D.C.

[21] Appl. No.: 707,775

[22] Filed: Mar. 4, 1985

[51] Int. Cl.$^4$ .................................................. C02F 1/28
[52] U.S. Cl. ...................................... 210/679; 210/688; 210/914
[58] Field of Search ................ 210/668, 679, 688, 914

[56] References Cited

U.S. PATENT DOCUMENTS 4,094,777 6/1978 Sugier et al. ........................ 210/679

Primary Examiner—Ivars Cintins
Attorney, Agent, or Firm—Katherine P. Lovingood; Stephen D. Hamel; Judson R. Hightower

[57] ABSTRACT

A process for removing mercury from water to a level not greater than two parts per billion wherein an anion exchange material that is insoluble in water is contacted first with a sulfide containing compound and second with a compound containing a bivalent metal ion forming an insoluble metal sulfide. To this treated exchange material is contacted water containing mercury. The water containing not more than two parts per billion of mercury is separated from the exchange material.

1 Claim, No Drawings

PROCESS FOR REMOVING MERCURY FROM AQUEOUS SOLUTIONS

This invention was developed persuant to a contract with the U.S. Department of energy.

BACKGROUND OF THE INVENTION

This invention relates to the process of removing mercury from water. Mercury is a toxic element, and if water is contaminated with it, standard water treatment processes used by public utilities are not effective for removal and levels become a problem if disposal is continued over a period of time.

The State of Tennessee limits the levels of mercury in drinking water to not more than two parts per billion. Levels of mercury in water discharged from treatment processes are negotiated but levels of two or less parts per billion are usually required. Methods were known for removal of mercury in waste water in the parts per million range, however, there are few known methods for purification to two parts per billion.

Previous studies have provided a method for removal of mercury from aqueous solutions by reacting the mercury with ferrous sulfide to produce mercuric sulfide; however, the level of mercury was still greater than two parts per billion. Use of materials such as cadmium, lead, silver and chromium sulfides is unsatisfactory because discharge of fluids containing these materials is severely restricted by statute.

Ion exchange resins specifically formulated for removing mercury from water were tried. Using procedures recommended by the manufacturer, attempts were made to remove mercury from water; however, levels of two parts per billion could not be reached.

In light of the difficulties involved in these attempts to remove mercury to a level of two parts per billion in water, a process was developed and that process is the subject of this invention.

SUMMARY OF THE INVENTION

In view of the above-stated needs it is an object of the invention to provide a process for removing mercury from water so levels of mercury remaining in the water need not exceed two parts per billion.

It is another object of this invention to provide a process for removing mercury from water that does not involve the use of other elements the presence of which in discharged water is severely restricted by law.

It is a further object of this invention to provide a process for the removal of mercury from water that allows the treatment of large volumes of water in a relatively short period of time.

To achieve the foregoing and other objects of this invention as embodied and broadly described herein, the process of this invention is the removal of mercury from water so that levels do not exceed two parts per billion. This is done using an ion exchange material that is treated to achieve maximum removal of mercury.

The starting material is an anionic exchange material that is insoluble in water. Preferably, a commercial anion exchange resin is used that has amine or quaternary ammonium active sites, or material can be prepared that is water insoluble amine dissolved in a resin or absorbed on a high surface area water insoluble solid but these materials are inferior to the commercial ones. This material is treated by contacting it with a sulfide solution to prepare it for a subsequent reaction with a selected metal ion. The sulfide used can be sodium sulfide, potassium sulfide, lithium sulfide, calcium sulfide, or other sulfide compounds capable of reacting with the anion exchange material and releasing a soluble salt that does not react with the anion exchange material. Using a sufficiently high concentration of sulfide in the solution, the original exchange material is thus converted to the sulfide form.

This converted material is further treated by soaking it in a solution containing a bivalent metal ion that reacts with the sulfide to form a water insoluble metal sulfide in and on the converted material thereby permeating the material with metal sulfide. The iron II ion is preferred and can be derived from an iron (II) halide, iron (II) sulfate, iron (II) carbonate, or other iron II compounds capable of forming iron (II) sulfide when contacted with the sulfide form of the converted material. This treated material is then washed with water to remove excess salts and other compounds from the material, and the material is ready to remove mercury from water. The contaminated water is passed over and through this material, and the material retains the mercury at the metal (II) sulfide sites, with water passing from the material containing less than two parts per billion mercury.

This procedure is an improvement on previous methods because it purifies water by removing mercury so its concentration is less than two parts per billion, whereas previous methods have not been effective in removing mercury to such low concentrations. It also has the advantage that large volumes of water can be purified in a relatively short period of time.

DETAILED DESCRIPTION OF THE PREFERRED EMBODIMENT

The ion exchange material is one in which the fixed ions are positive so that the material can exchange anions and is of a structure that makes it solid and substantially insoluble in water. This ion exchange material can be typically a commercial anion exchange resin. For the purposes of the invention the ion exchange material is converted to a form in which most, if not all, of the anions on the resin are sulfide ions. This is typically done by contacting the resin with a concentrated solution containing sulfide ions with the ion originally on the resin one of those easily displaced by sulfide. The excess of the soluble sulfide solution is removed by washing with water and the washed resin is contacted with a concentrated solution of ferrous state iron in which the ferrous ions are in the simple form normally subject to precipitation by sulfide ion as ferrous sulfide. The excess of the ferrous solution is washed from the resin and it is then ready for the recovery of mercury from dilute solutions.

The treated resin has ferrous sulfide precipitated in and on the resin and some residual sulfide ions still bound to the resin. It is believed that the mercury is precipitated on the surface of the ferrous sulfide. The ferrous sulfide surface is believed to be kept in a receptive form by the residual sulfide on the ion exchange resin.

The excess of sulfide, and perhaps some polysulfide, ions on the resin is believed to make it possible for the system to absorb mercury from solution whether it is in the metallic or ionic forms. Thus, this resin supported activated ferrous iron sulfide is able to concentrate mercury from the most dilute solutions.

Because of the sensitivity of the system to acid in which the ferrous sulfide dissolves and to strong alkali that can remove the sulfide ion from the resin, this process works best near neutral, in the region of pH 5–10. This process is dependent on the solid substrate of the resin, or other anion exchange material, for the support of the high surface area ferrous sulfide and the excess of sulfide ion.

EXAMPLE

An anion exchange resin in the hydroxyl form was first treated by soaking it in a concentrated solution of sodium sulfide. The resin was then washed with distilled water and soaked in a solution of ferrous chloride. It is believed that this treatment produces a "fixed" resin that holds a sulfur ion which in turn is bound to a ferrous ion.

A series of water samples were prepared containing known amounts of mercury. The pH of the water solutions was adjusted to about 7.5. These samples were passed through a column of the "fixed" iron resin at a rate of 1.5 gal/min/ft$_3$ of resin. The contact time of the water with the resin column was about five minutes. The water samples eluded from the resin were collected and analyzed for mercury content. The results are tabulated in Table I below.

TABLE I

| Water Sample Number | Mercury in Prepared Sample of Water (Parts per billion) | Mercury in Sample of Water Eluted from Column of Resin (Parts per billion) |
|---|---|---|
| 1 | 6 | <1 |
| 2 | 76 | <1 |
| 3 | 26 | <1 |
| 4 | 37 | 3 |
| 5 | 39 | 2 |
| 6 | 34 | 2 |
| 7 | 16 | 1 |
| 8 | 12 | 2 |
| 9 | 6 | <1 |
| 10 | 34 | 2 |
| 11 | 10 | 2 |
| 12 | 9 | 2 |

The process successfully removed mercury from the samples to two parts per billion in eleven tests out of twelve. The resin can be used to clean about 1,000 gallons of water per cubic foot of resin. When the water begins to contain more than two parts per billion of mercury a fresh column can be used or the original column could be cleaned by washing with an acidic solution and fixing the sulfur iron resin again.

We claim:

1. A process for removing mercury from water so that the concentration of mercury remaining does not exceed two parts per billion comprising:
    conducting said process at pH of 5 to pH 10;
    contacting an anion exchange material with a solution containing sulfide ions wherein said anion exchange material is selected from the group; an anion exchange resin with amine active sites, an anion exchange resin with quaternary ammonium active sites, a water insoluble amine dissolved in a resin, or a water insoluble amine absorbed on a high surface area water insoluble solid; and said sulfide ions are derive from a compound selected from the group; sodium sulfide, potassium sulfide, lithium sulfide, calcium sulfide, or other sulfide compounds capable of reacting with said anion exchange material and releasing a soluble salt that does not react with said anion exchange material, said anion exchange material and said sulfide ions present in a concentration sufficient to form a sulfide form of said anion exchange material resulting in a converted material;
    contacting said converted material with a solution containing an iron (II) ion that is derived from a compound selected from the group: iron (II) halide, iron (II) sulfate, iron (II) carbonate, or other iron (II) compounds capable of forming iron (II) sulfide when contacted with said converted material resulting in an iron (II) sulfide permeated material;
    washing with water any excess of said solution containing said iron (II) ion from said iron (II) sulfide permeated material;
    contacting said iron (II) sulfide permeated material with water containing mercury resulting in the removal of mercury from water producing water containing not more than two parts per billion mercury; and
    separating said water containing not more than two parts per billion mercury from said iron (II) sulfide permeated resin

* * * * *